(12) United States Patent  
Raszkowski (10) Patent No.: US 8,617,026 B2  
(45) Date of Patent: Dec. 31, 2013

(54) FACE SPLINE CLUTCH (75) Inventor: James A. Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 94 days.

(21) Appl. No.: 13/275,510

(22) Filed: Oct. 18, 2011

(65) Prior Publication Data

US 2012/0181135 A1 Jul. 19, 2012

Related U.S. Application Data (60) Provisional application No. 61/394,635, filed on Oct. 19, 2010.

(51) Int. Cl.
*F16H 57/08* (2006.01)
*F16D 43/28* (2006.01)
*F16D 13/60* (2006.01)

(52) U.S. Cl.
USPC .......................... 475/343; 192/108; 192/85.18

(58) Field of Classification Search
USPC ............ 475/343; 192/108, 85.18, 69.82, 69.7
See application file for complete search history.

(56) References Cited

U.S. PATENT DOCUMENTS

| | | | |
|---|---|---|---|
| 4,157,135 A | 6/1979 | Devlin et al. | |
| 4,280,583 A | 7/1981 | Stieg | |
| 4,450,943 A | 5/1984 | Long, Jr. | |
| 4,615,422 A | 10/1986 | Thebert | |
| 4,932,809 A | 6/1990 | Kopp | |
| 5,628,703 A * | 5/1997 | Roeper | 475/159 |
| 2002/0028722 A1 | 3/2002 | Sakai et al. | |
| 2003/0183479 A1 * | 10/2003 | Rau et al. | 192/108 |
| 2006/0166777 A1 | 7/2006 | Aikawa et al. | |
| 2008/0110718 A1 * | 5/2008 | Nelbock et al. | 192/108 |

OTHER PUBLICATIONS

International Search Report and the Written Opinion for International Application No. PCT/US11/56636, dated Mar. 13, 2012, (10 pages).

* cited by examiner

*Primary Examiner* — Edwin A Young
(74) *Attorney, Agent, or Firm* — Barnes & Thornburg LLP (57) ABSTRACT

A mode shift assembly for a transmission comprises has a first side coupled to a rotational input, a second side coupled to a rotational output, and an actuator. The actuator acts on the first side to move the first side between a first position in which the first and second engagement surfaces are disengaged and a second position. In the first position, rotation between the first and second sides is independent. In the second position, the first and second engagement surfaces are engaged such that rotation is transferred from the first side to the second side.

31 Claims, 7 Drawing Sheets

FACE SPLINE CLUTCH

CROSS-REFERENCE TO RELATED APPLICATIONS

This application claims priority under 35 U.S.C. §119(e) to U.S. Provisional Application Ser. No. 61/394,635, filed Oct. 19, 2010, which is expressly incorporated by reference herein.

FIELD OF THE INVENTION

The present disclosure is related to clutch assemblies of the type used in vehicle transmissions.

BACKGROUND

Clutch assemblies selectively transfer rotational motion between a power source and a driven member. By selectively engaging multiple stages of clutch assemblies within a transmission, the ratio of input rotation to output rotation is varied. Known clutch assemblies utilize multiple friction plates interposed between multiple reaction plates. An actuator is energized when the clutch is engaged so that the faces of the reaction plates and friction plates engage to transfer torque between the friction plates and reaction plates. As higher reaction loads are required, the number of plates is typically increased to increase the reaction surface area.

When the clutch is disengaged, the friction plates and reaction plates are separated by a minimal distance to maintain a low travel required to engage the clutch and/or to minimize the size of the clutch assembly. The relative movement between the friction plates and reaction plates as the friction plates rotate causes the fluid between the plates to be worked, causing heating of the fluid. Such an assembly is susceptible parasitic losses due to the friction between the adjacent, but unengaged plates, thereby reducing the power transferred through the transmission by the resistance to rotation of the plates when the clutch is de-energized, causing the clutch to unnecessarily consume power.

SUMMARY

The present application discloses one or more of the features recited in the appended claims and/or the following features which, alone or in any combination, may comprise patentable subject matter:

In a first aspect of the present disclosure, an infinitely variable transmission includes a rotational input, a rotational output, and a mode shift apparatus. The mode shift apparatus includes a first side, a second side, and an actuator acting on the first side.

The first side is coupled to the rotational input. The first side includes a first engagement surface having an imaginary center corresponding generally to the axis of rotation of the rotational input. The first engagement surface is formed to include a number of radially extending channels that increase in size as they extend radially.

The second side is coupled to the rotational output. The second side includes a second engagement surface having an imaginary center corresponding generally to the axis of rotation of the rotational input. The second engagement surface is formed to include a number of radially extending splines that increase in size as they extend radially. The radially extending splines are sized to engage the channels of the first engagement surface. The second side forms a spur gear including a number of teeth positioned about the periphery of the gear. The splines are positioned on a face of the spur gear with the spline defining an axis that is generally perpendicular to a longitudinal axis of the teeth of the spur gear.

The actuator is hydraulically powered. The actuator acts on the first side to move the first side between a first position in which the first and second engagement surfaces are disengaged and a second position. When the first and second sides are disengaged, rotation between the first and second sides is independent. When the actuator is in the second position, the first and second engagement surfaces are engaged such that rotation is transferred between the first side and the second side.

In some embodiments, the actuator is selectively actuable between a de-energized state and an energized state. The channel may define a taper angle that engages the spline such that during rotation of the first and second sides an axial force is induced between the spline and the channel of sufficient magnitude to cause the first side to disengage from the second side if the actuator is de-energized.

In some embodiments, a radially extending channel defines an axis that extends along the length of the channel. The cross-section of the channel may define a v-shaped profile. A radially extending spline may define an axis that extends along the length of the spline. A cross-section of the spline may define a v-shaped profile.

In some embodiments, the channel defines a taper angle that engages the spline such that an axial force is induced between the spline and the channel of sufficient magnitude to cause the first side to disengage from the second side if the actuator is in the first position.

In some embodiments, the second side may be positioned on the input shaft such that the second side and the input shaft have a common axis of rotation.

In some embodiments, the first side may move in a direction parallel to the axis of rotation of the input shaft.

In some embodiments, the actuator is hydraulically powered.

In a second aspect of the present disclosure, a mode shift assembly for a transmission includes a first side coupled to a rotational input, a second side coupled to a rotational output, and an actuator. The first side includes a first engagement surface having an imaginary center corresponding generally to the axis of rotation of the input. The first engagement surface is formed to include a radially extending channel. The second side includes a second engagement surface having an imaginary center corresponding generally to the axis of rotation of the rotational input. The second engagement surface is formed to include a number of radially extending splines sized to engage the channels of the first engagement surface. The actuator acts on the first side to move the first side between a first position in which the first and second engagement surfaces are disengaged and a second position. In the first position, rotation between the first and second sides is independent. In the second position, the first and second engagement surfaces are engaged such that rotation is transferred from the first side to the second side.

The channels formed in the first engagement surface may have a uniform size as they extend radially from the imaginary center. The splines formed in the second engagement surface also may have a uniform size as they extend radially. In some embodiments, the channels formed in the first engagement surface vary in size as they extend radially and the splines formed in the second engagement surface vary in size as they extend radially. For example, the channels formed in the first engagement surface may increase in size as they extend radially and the splines formed in the second engagement surface increase in size as they extend radially.

In some embodiments a radially extending channel defines an axis that extends along the length of the channel and the cross-section of the channel defines a v-shaped profile. In some embodiments a radially extending spline defines an axis that extends along the length of the spline and wherein a cross-section of the spline defines a v-shaped profile.

The actuator may be selectively actuable between a de-energized state and an energized state. The channel may define a taper angle that engages the spline such that an axial force is induced between the spline and the channel of sufficient magnitude to cause the first side to disengage from the second side if the actuator is de-energized.

The second side may be positioned on the input shaft such that the second side and the input shaft have a common axis of rotation. The first side may move in a direction that is parallel to the axis of rotation of the input shaft.

The actuator may be hydraulically powered. The first side may be biased to the first position.

The second side may comprise a spur gear including a number of teeth positioned about the periphery of the gear. The spline may be positioned on a face of the spur gear with the spline defining an axis that is generally perpendicular to a longitudinal axis of the teeth of the spur gear.

When the first side is in the second position, the mode shift apparatus may transfer rotation to an output having an axis of rotation that is parallel to the axis of rotation of the input shaft. The rotational direction of the output shaft may be opposite of the rotational direction of the input shaft. In some embodiments, the mode shift apparatus may be part of a continuously variable transmission. In some embodiments, the mode shift apparatus may be part of an infinitely variable transmission.

In a third aspect of the present disclosure, a transmission includes a rotational input, a rotational output, and a mode shift apparatus. The mode shift apparatus includes a first side, a second side, and an actuator. The first side includes a first engagement surface formed to include a number of radially extending channels. The second side includes a second engagement surface formed to include a number of radially extending splines sized to engage the channels of the first engagement surface. The actuator is selectively actuable to move the second side in and out of engagement with the first side. When the second side is engaged with the first side, the mode shift apparatus transfers rotational motion between the rotational input and the rotational output.

In some embodiments, the radially extending channels and radially extending splines vary in size as they extend radially.

In some embodiments, the radially extending channels and the radially extending splines increase in size as they extend radially.

In some embodiments, each of the channels define a taper angle that engages a respective spline such that an axial force is induced between the spline and the channel of sufficient magnitude to cause the second side to disengage from the first side during rotation if no force is applied to the second side to maintain engagement.

In some embodiments, a radially extending channel defines an axis that extends along the length of the channel. The cross-section of the channel may define a v-shaped profile. A radially extending spline may define an axis that extends along the length of the spline and a cross-section of the spline may define a v-shaped profile.

In some embodiments, one of the first or second sides may be coupled to a carrier of a planetary gear set.

In some embodiments, one of the first or second sides may be coupled to a sun gear of a planetary gear set.

In some embodiments, one of the first and second sides may form a spur gear including a number of teeth positioned about a periphery of the side. The spline or the channel of the respective side may be positioned on a face of the spur gear with the spline or channel defining an axis that is generally perpendicular to a longitudinal axis of the teeth of the spur gear.

In some embodiments, the actuator is hydraulically powered.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The systems and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
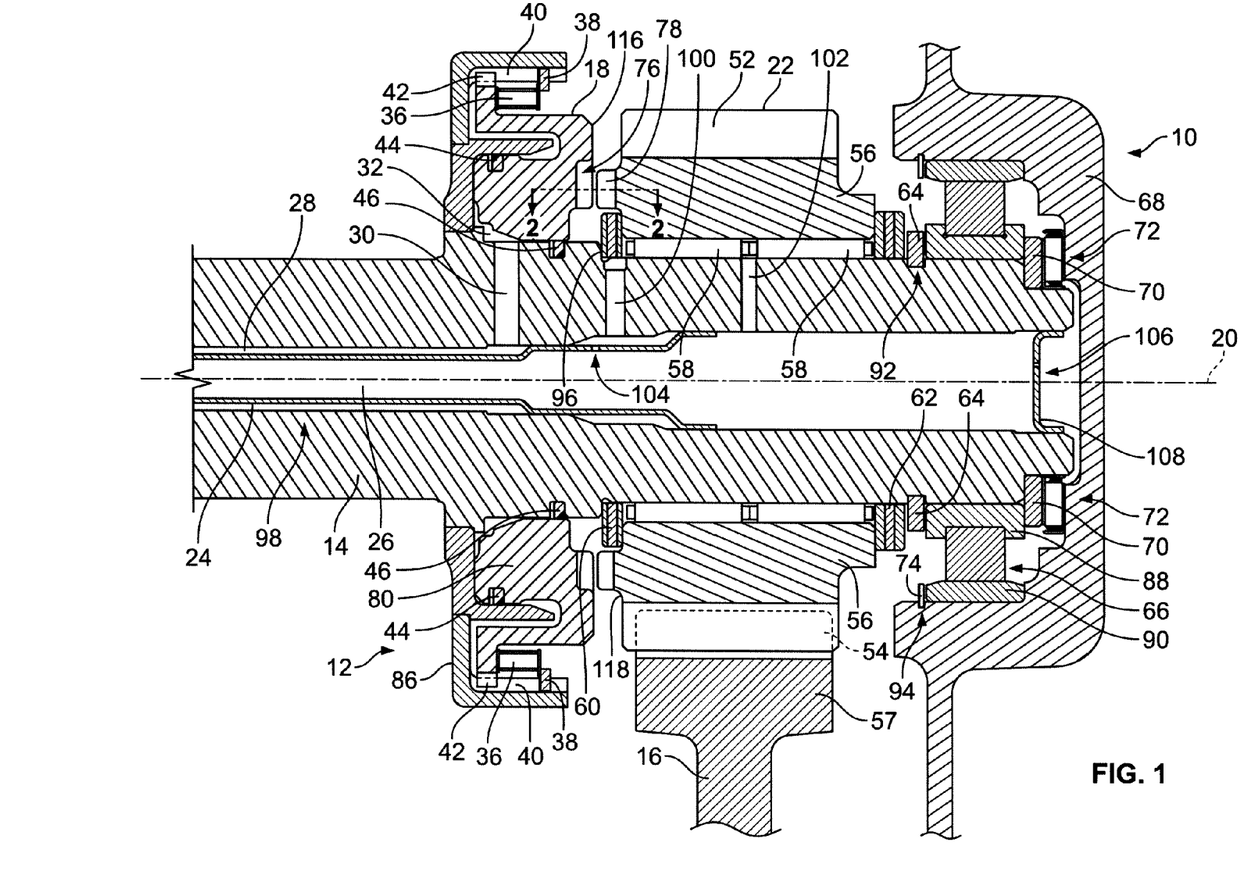
FIG. 1 is a cross-sectional view of a portion of an automatic transmission including a clutch assembly showing the clutch assembly disengaged.
Figure 3:
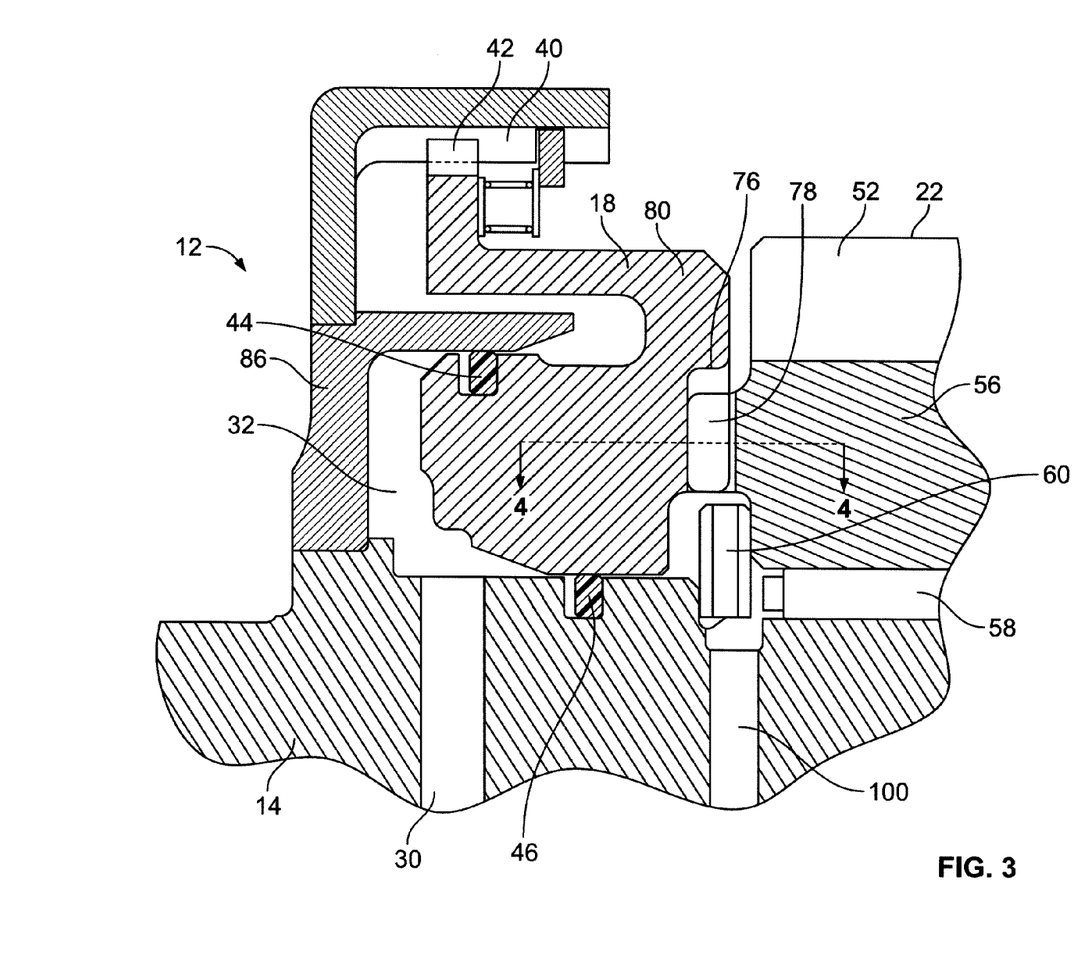
FIG. 3 is a magnified cross-sectional view of a portion of the automatic transmission of FIG. 1 showing the clutch assembly engaged.

An embodiment of a transmission assembly 10 includes a clutch assembly 12 shown in a disengaged state in FIG. 1. When the clutch assembly 12 is disengaged, a first side 18 of the clutch assembly 12 is fixed to a shaft 14 and rotates with the shaft about an axis 20. A second side 22 is engaged with a gear 16 and is free to rotate relative to the shaft 14 about the axis 20. When the clutch assembly 12 is engaged as shown in FIG. 3, the first side 18 engages the second side 22 such that the first side 18 and second side 22 move together about axis 20.

The first side 18 is supported on the shaft 14 and engages a flange 86 secured to the shaft 14. The flange 86 includes a number of splines 40 which extend parallel to the axis 20. The first side 18 includes a number of teeth 42 which engage the splines 40. Engagement of the splines 40 and teeth 42 causes rotation of the shaft 14 to be transferred to the first side 18. When the first side 18 and second side 22 are engaged, the rotation of the shaft 14 is transferred through the first side 18 to the second side 22 so that the second side 22 rotates with the shaft 14. This causes rotation of the shaft 14 to be transferred to the gear 16 through the clutch assembly 12.

The shaft 14 is supported in a housing 68 of the transmission assembly 10 on a bearing 66 so that the shaft 14 rotates relative to the housing 68. Any axially directed forces are transferred to the housing 68 through a thrust bearing 72 which is positioned adjacent the housing 68 at the end of the shaft 14 and engaged by a spacer 70. The position of an inner race 88 of the bearing 66 is maintained by a retainer 64 supported in an annular groove 92 formed in the shaft 14. Similarly, an outer race 90 of the bearing 66 is held in place relative to the housing 68 by a retainer 74 positioned in an annular groove 94 formed in the housing 68.

The second side 22, illustratively embodied as a pinion gear, is supported on needle bearings 58 that are supported on the shaft 14. The needle bearings 58 allow the second side 22 to move relative to the shaft 14 when the second side 22 is not engaged with the first side 18. The second side 22 includes a body 56 with pinion teeth 52 extending radially outwardly from the body 56. The second side 22 also includes splines 78 formed on a side of the body 56 to extend axially from the body 56, with the each of the splines 78 defining an axis 82 that extends radially from the axis 20.

The second side 22 is restrained from movement along the shaft 14 by thrust bearings 60 and 62. The thrust bearing 60 is seated against an annular face 96 formed in the shaft 14. The thrust bearing 62 is engaged with the retainer 64 with the second side 22 positioned between the bearings 60 and 62. The second side 22, when disengaged from the first side 18, is supported on the needle bearings 58 so that movement of the shaft 14 about axis 20 is independent of the second side 22. For example, the gear 16 may resist rotation of the second side 22 such that the shaft 14 rotates relative to the second side 22.

The shaft 14 forms a central channel 98 which facilitates the flow of hydraulic fluid and lubricant to the components of the clutch assembly 12. A tube 24 is inserted into the channel 98 to form two fluid paths 26 and 28. The fluid path 26 provides a flow path for lubricants to flow through an orifice 104 formed in the tube 24 and through a radial channel 100 to provide a path for lubricant to flow to the thrust washer 96 and face spline. A second radial channel 102 provides a flow path for lubricant to flow to the needle bearings 58. An end cap 108 secured in the channel 98 also includes an orifice 106 which provides a fluid path for lubricant to flow to the bearings 66 and 72.

The tube 24 also defines a second, annular flow path 28 which allows hydraulic fluid, under pressure, to act on the first side 18. The hydraulic fluid flows through fluid path 28 to a radially extending channel 30 and into a cavity 32. The pressure of the hydraulic fluid acts on the first side 18 to cause the first side 18 to move axially to engage the second side 22. Two seals 44 and 46 constrain the hydraulic fluid to the cavity 32 which expands as the first side 18 moves axially to engage the second side 22 as shown in FIG. 3. The stationary flange 86 and the hydraulic fluid expanding cavity 32 form an actuator which moves the first side 18 when the hydraulic fluid is pressurized. Movement of the first side 18 is resisted by a number of springs 36 which are positioned between the first side 18 and a stop 38 secured to the flange 86. Referring now to FIG. 3, when the hydraulic fluid is pressurized, the force of the pressurization overcomes the bias of the springs 36 to move the first side 18, expanding the cavity 32. When the hydraulic pressure is released, the bias of the springs 36 urge the first side 18 back to the position shown in FIG. 1.

Figure 2:
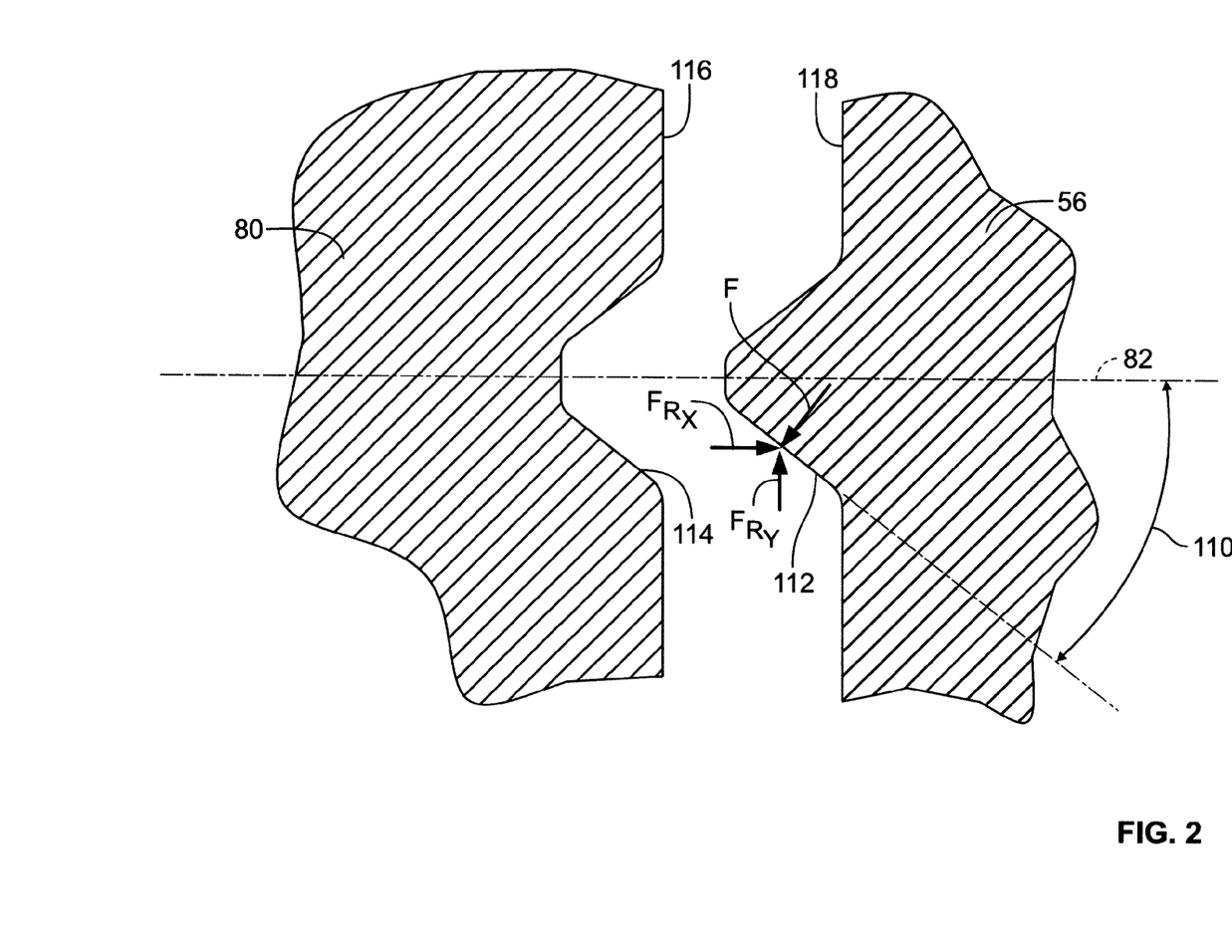
FIG. 2 is a cross-sectional view of a portion of the clutch assembly of FIG. 1 taken along lines 2-2 in FIG. 1 with portions removed.

The first side 18 includes a body 80 which forms a number of channels 76 in a surface 116. As shown in the cross-sectional view of FIG. 2, the channels 76 extend radially from a centerline of the body 80 which corresponds to the axis 20 when the clutch assembly 12 is assembled. Similarly, the second side 22 includes a body 56 and a number of splines 78 formed on a surface 118 of the body 56, with each spline 78 extending radially from a centerline of the body 56 which corresponds to the axis 20 when the clutch assembly 12 is assembled. The splines 78 are spaced about the centerline of the body 56 in a symmetrical configuration. The channels 76 are also formed in a symmetrical pattern about the centerline of the body 80 of the first side 18 with at least one channel 76 being formed for each spline 78 on the second side 22. In some embodiments, the number of channels 76 may be a multiple of the number of splines 78 to that the splines 78 may engage different sets of channels 76.

Movement of the first side 18 toward the second side 22 while the first side 18 is rotating relative to the second side 22 allows the engagement of the splines 78 with the channels 76 to cause the first side 18 to engage the second side 22 and transfer the rotation of the shaft 14 to the second side 22.

The gear 16 includes a body 57 and a number of pinion teeth 54 formed on periphery of the body 57. The second side 22 includes the pinion teeth 52 which engage the pinion teeth 54 of the gear 16 such that rotation of the second side 22 is transferred to the gear 16. Thus, the clutch assembly 12 is selectively engageable to transfer rotation between the shaft 14 and the gear 16. While in the illustrative embodiment the shaft 14 has been described as the driving member, it should be understood that in some embodiments the gear 16 may be driven such that engagement of the first side 18 and second side 22 transfers rotation from the gear 16 to the shaft 14. In some embodiments, the second side 22 and the gear 16 may form a portion of a planetary gear set.

Figure 4:
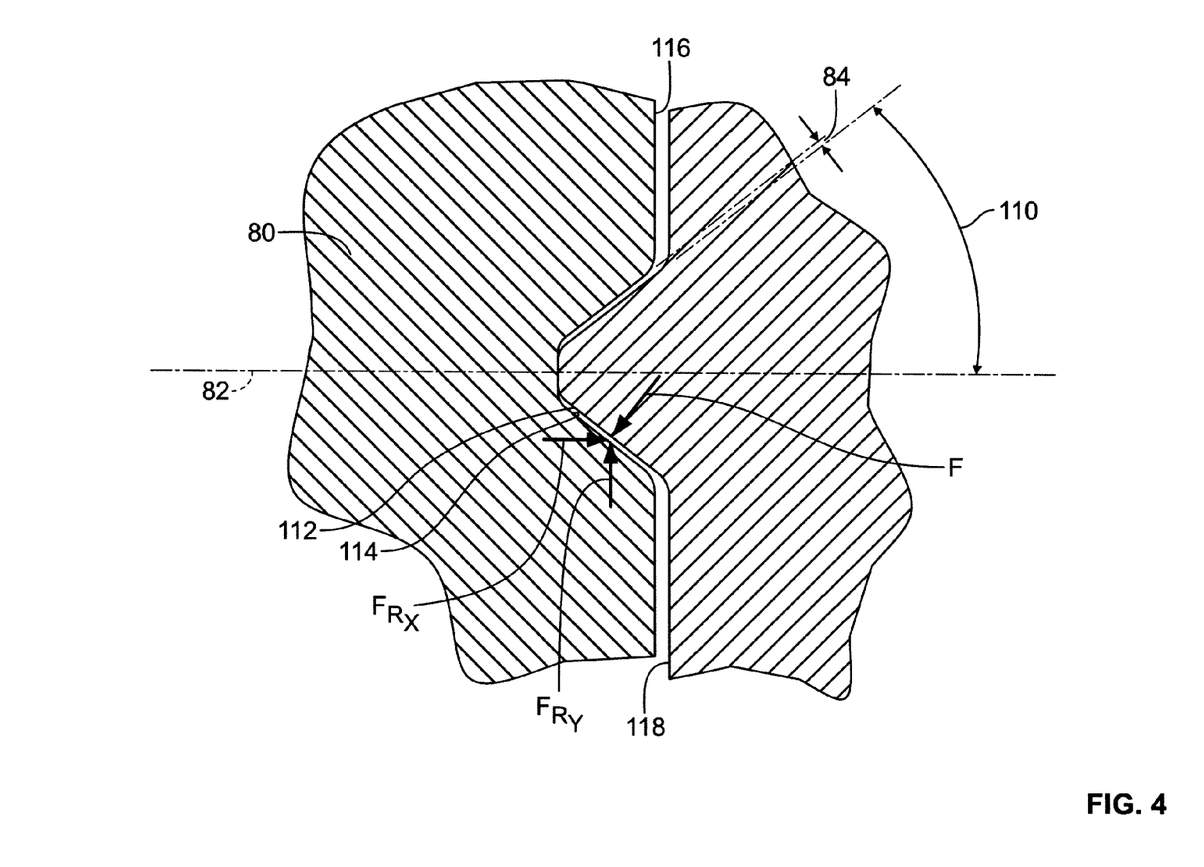
FIG. 4 is a cross-sectional view of a portion of the clutch assembly of FIG. 3 taken along lines 4-4 in FIG. 3 with portions removed.
Figure 5:
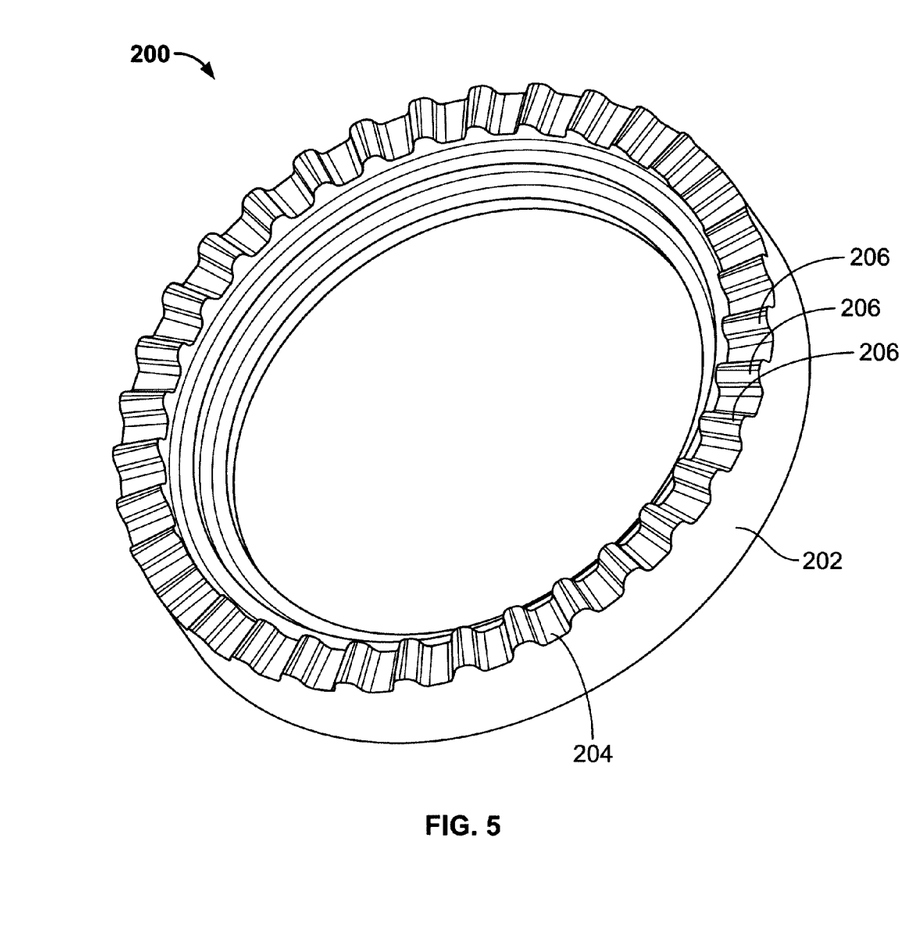
FIG. 5 is a perspective view of an embodiment of a clutch member.

Referring now to FIG. 4, when the spline 78 is engaged with the channel 76, a face 112 of the spline 78 engages a face 114 of the channel 76 such that a force F is transferred from the face 112 to the face 114. The reactant force has two components $F_{Ry}$ and $F_{Rx}$ which counteract the force F. The component $F_{Ry}$ is representative of the force perpendicular to the axis 20 and is directly related to the torque transferred between the first side 18 and second side 22. The component $F_{Rx}$ is parallel to the axis 20 and is representative of the clamping force necessary to maintain the engagement of the first side 18 with the second side 22. The magnitude of a tooth angle 110 directly affects the resultant magnitude of the two reactant components such that the steeper the angle 110, the larger the magnitude of $F_{Rx}$ necessary to maintain engagement of the first side 18 and the second side 22. Because the transmission assembly 10 has to develop the hydraulic pressure necessary to maintain the engagement, minimizing the angle 110 reduces losses in the transmission assembly 10 that reduce the torque transferred between the first side 18 and second side 22. In addition, the choice of the angle 110 affects disengagement of the first side 18 and second side 22. A gap 84 is maintained between the channel 76 and splines 78 on the trailing side such that when the clutch assembly 12 is de-energized, the first side 18 will disengage the second side 22 without contact to reduce any losses during the disengagement and to reduce potential for contact between the trailing sides of the splines 78 and channels 76 to thereby minimize damage. The gap 84 also reduces the potential for binding if the splines 78 and channels 76 are slightly misaligned.

The sum of the force generated by the hydraulic pressure on the first side 18 and the resistance force of the bias of the springs 36 must be slightly greater than the theoretical magnitude of $F_{Rx}$ to maintain the engagement of the first side 18 with the second side 22 with the minimum loss of power through the clutch assembly 12.

In the illustrative embodiment, the channel 76 and the spline 78 each have a cross-section profile that have the same dimension along their respective radial lengths. In some embodiments, the size of the channels 76 and splines 78 may vary along the radial length. For example, the channels 76 and splines 78 may each increase in size from a point near the centerline of the respective first side 18 and second side 22 such that they become proportionally larger as they extend radially outwardly. Similarly, they may become proportionally smaller as they extend outwardly.

An illustrative embodiment of a face spline clutch member 200 shown in FIGS. 5-8 may be used as the first side 18 or the second side 22 of the clutch assembly 12. The clutch member 200 includes a body 202 and a face 204. The face 204 includes a number of teeth 206. Each radial segment on a tooth flank is perpendicular to the centerline of 200 while intersecting the tooth angle projection plane at the outside diameter of 200. The projection plane contains the angle 110. The geometry of the teeth 206 includes fillets at the root and radii at the tip to eliminate sharp corners and, thereby, reduce the magnitude of the stress risers. The geometry of the teeth 206 permits the face 204 of a first clutch member 200 to be engaged with the face 204 of a second clutch member 200 while one or both of the clutch members 200 are rotating about their axis so that during engagement of the teeth 206 of the first clutch member 200 with the teeth 206 of the second clutch member 200, the teeth 206 mesh with surface contact. By avoiding point contact between the meshed teeth 206 of the engaged first clutch member 200 and second clutch member 200, the forces transferred between the members are distributed to improve wear and load carrying characteristics of the teeth 206.

Figure 6:
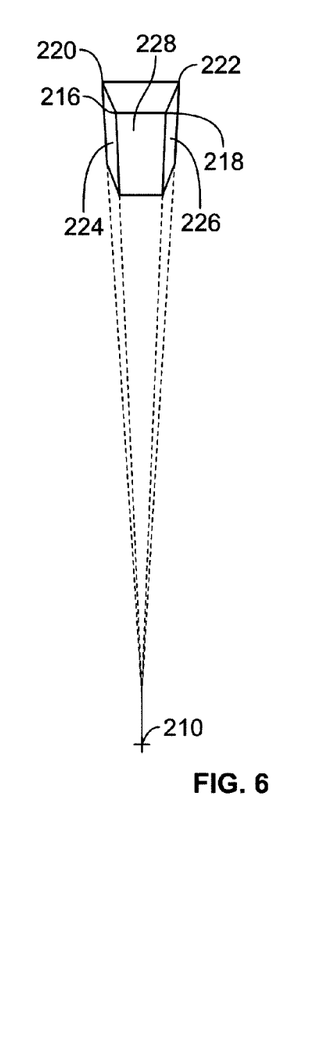
FIG. 6 is a perspective view of a tooth of the clutch member of FIG. 5.
Figure 7:
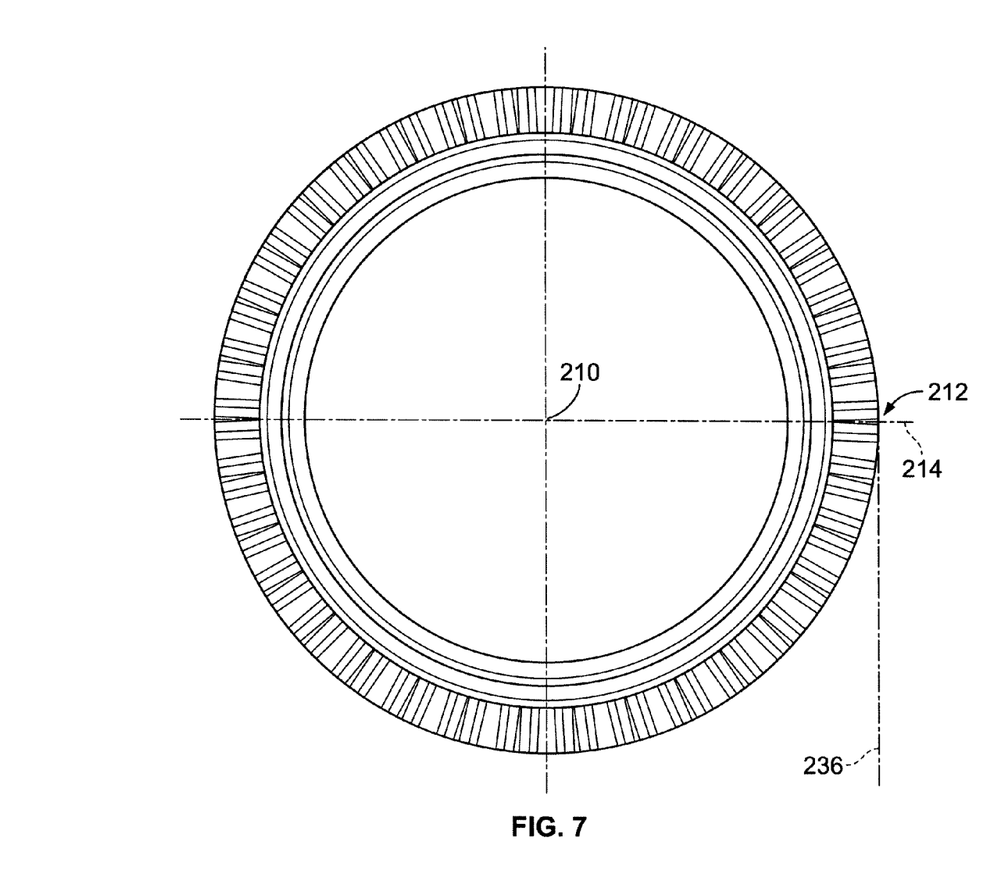
FIG. 7 is a front view of the clutch member of FIG. 5.
Figure 8:
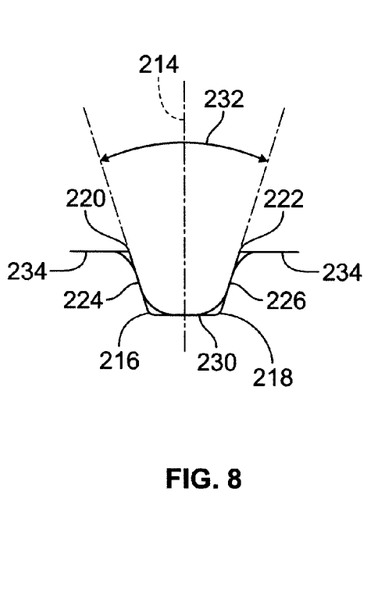
FIG. 8 is a side view of a tooth of the clutch member of FIG. 5.

Referring now to FIG. 7, the teeth 206 are each centered on a ray which extends from a rotational axis 210. For example, a representative tooth 212 is centered on a ray 214. The width of the tooth 212 increases in size along the ray 214 as the tooth 212 extends radially outwardly over the length of the tooth 206. A tooth projection plane 236 is defined as the plane that is tangent to the ray 214 and the outer edge of the tooth 212. Referring now to FIG. 6, an isometric view of the tooth 212 is shown as a projection from the axis 210. The view of the tooth 212 profile is shown from the tooth projection plane 236 in FIG. 8. As can be seen in FIG. 6, two points 216 and 220 can be used to define a surface 224 by projecting the points at the tooth projection plane 236 to the axis 210. Similarly, two points 218 and 222 are projected at the tooth projection 236 plane to the axis 210 to define a surface 226.

Referring again to FIG. 8, adjacent teeth 206 are separated by a root surface 234 with the surfaces 224 and 226 acting as engagement surfaces when the teeth of one member 200 engages another member 200. The surfaces 224 and 226 are opposed by an angle 232 which is illustratively 35 degrees in the embodiment shown. An upper surface 230 of the teeth 206 is seated against the root surface 234 when two members 200 are fully engaged. When disengaged, the surfaces 224 and 226 allow the members 200 to disengage without excessive wear or pressure. The angle 232 provides sufficient force to disengage the members 200 when the first side is de-energized.

Utilizing the clutch assembly 12, a multi-mode continuously variable or infinitely variable transmission may engage the clutch assembly 12 at or near synchronous rotational speeds. The profile of the channels 76 and splines 78 or the teeth 206 permit the engagement and disengagement of the first side 18 with the second side 22 while either one or both of the respective parts are rotating while minimizing the space required for the torque transfer. Thus, the embodiment described herein minimizes the power needed to engage the clutch assembly 12, provides synchronous engagement, and minimizes the space required in addition to other benefits that will be readily recognized by those of ordinary skill in the art.

Figure 9:
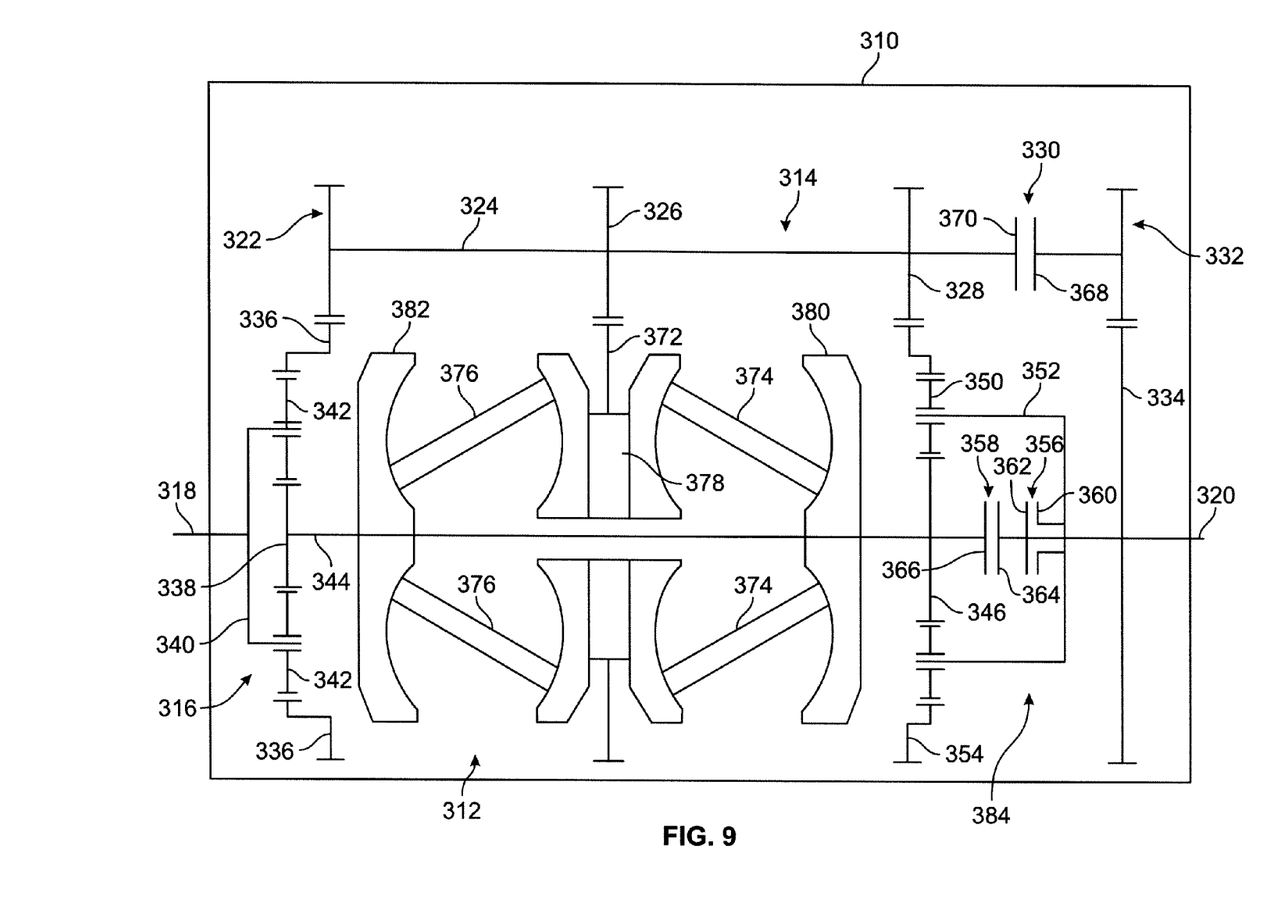
FIG. 9 is a schematic view of an multi-mode infinitely variable transmission.

As an example, an illustrative embodiment of a multi-mode infinitely variable transmission 310 is shown in FIG. 9. The transmission 310 includes a rotational input 318 and a rotational output 320. The rotational input 318 is configured to be coupled to a prime mover such as an internal combustion engine or an electric motor with the prime mover having a rotational output that drive the rotational input 318. The rotational output 320 outputs a rotational output and is configured to drive a rotational load such as a driven axle of a vehicle. The transmission 310 includes an input planetary gear set 316 that is operable to drive a continuously variable stage 312 and a counter shaft assembly 314.

The planetary gear set 316 includes a carrier 340 coupled to the rotational input 318. The carrier 340 supports a number of planetary gears 342 that mesh with a sun gear 338. The sun gear 338 is coupled to a drive shaft 344 that transfers motion to the continuously variable stage 312, as will be discussed in further detail below. The planetary gears 342 intermesh with an annular gear 336. The annular gear 336 intermeshes with a pinion 322 coupled to a counter-shaft 324 of the counter-shaft assembly 314. As will be discussed in further detail below, the interaction between loads on the counter-shaft 324 and the driveshaft 344 cause variations in the speed of rotation of the rotational output 320.

The counter-shaft 314 drives an output planetary gear set 384. The transmission 310 also includes a first clutch assembly 330 which is operable to selectively couple the counter shaft assembly 314 to a pinion 332 that drives a gear 334 coupled to the rotational output 320.

The continuously variable stage 312 includes two input plates 380 and 382 which are directly coupled to the driveshaft 344 and rotate with the driveshaft 344. An output 378 of the continuously variable stage 312 is driven by a number of rollers including rollers 374 that transfer motion from the input plate 380 to the output 378. Similarly, a number of rollers 376 transfer rotation from the input plates 382 to the output 378. In the illustrative embodiment, the continuously variable stage 312 is a toroidal variator as is known in the art and the orientation of the rollers 374 and 376 are variable to change the ratio between the inputs 380, 382 to the output 378. The output 378 includes a pinion structure 372 that drives a pinion 326 coupled to the counter-shaft 324. The ratio of the rotation of the counter-shaft 324 and the driveshaft 344 is adjusted by changing the orientation of the rollers 374 and 376 with the planetary gear set 316 operating to provide mechanical feedback between the inputs 380, 382 and the output 378.

The counter-shaft 314 drives the output planetary gear set 384 through a pinion 328 coupled directly to the counter shaft 324. The pinion 328 is intermeshed with an annular gear 354 of the output planetary gear set 384. The annular gear 354 intermeshes with a number of planetary gears 350 that are supported on a carrier 352. The planetary gears 350 are also intermeshed with a sun gear 346 that is coupled to the driveshaft 344.

The transmission 310 includes three clutches 330, 358, and 356. The first clutch 330 includes a first side 368 that is movable to engage with a second side 370 to directly engage the counter shaft 324 to the pinion 332. The first side 368 and the second side 370 both include structures similar to that disclosed with regard to the first side 18 and the second side 22 discussed above with regard to the illustrative embodiment of FIG. 1.

A second clutch 358 has a first side 364 and a second side 366 with the second side 366 being engaged with the driveshaft 344 for movement therewith. When the second clutch 358 is energized, the second side 366 engages with the first side 364 in a manner similar to that described with regard to the illustrative embodiment of FIG. 1. The engagement of the second side 366 with the first side 364 causes the rotational output 322 be directly engaged with the driveshaft 344.

In a third clutch 356, a first side 360 is coupled to the carrier 352 for movement therewith. A second side 362 is coupled to the rotational output 320 for movement therewith. When the third clutch 356 is energized, the second side 362 engages the first side 360 so that the carrier 352 and the rotational output 320 are coupled directly together for rotational movement.

By varying the engagement of the first clutch 330, second clutch 358, and third clutch 356, and by varying the orientation of the rollers 374 and 376, the rotation received at rotational input 318 and transferred to rotational output 320 is infinitely variable.

While the illustrative embodiment of FIG. 9 includes a toroidal variator as the continuously variable stage, it should be understood that the face spline clutch of the present disclosure is equally applicable to other multi-mode transmission structures. As disclosed herein, the face spline clutch arrangement may be applied to a counter shaft arrangement that requires selective engagement. The face spline clutch of the present disclosure may also be applied to a direct drive clutch application such as that discussed with regard to the second clutch 358. The face spline clutch may also be applied to a planetary gear set such as that discussed with regard to third clutch 356. The structure of the continuously variable stage may vary between the toroidal variator approach shown herein, a traditional belt drive CVT, a chain drive CVT, or other similar structures known in the art and is especially applicable in applications that involve synchronous or near synchronous shifts.

Although certain illustrative embodiments have been described in detail above, variations and modifications exist within the scope and spirit of this disclosure as described and as defined in the following claims.

The invention claimed is:
1. An infinitely variable transmission comprising
a rotational input,
a rotational output,
a mode shift apparatus including
a first side coupled to the rotational input, the first side including a first engagement surface having an imaginary center corresponding generally to the axis of rotation of the input, the first engagement surface formed to include a number of radially extending channels that increase in size as they extend radially,
a second side coupled to the rotational output, the second side including a second engagement surface having an imaginary center corresponding generally to the axis of rotation of the rotational input, the second engagement surface formed to include a number of radially extending splines that increase in size as they extend radially, the radially extending splines sized to engage the channels of the first engagement surface, the second side forming a spur gear including a number of teeth positioned about the periphery of the gear with the splines positioned on a face of the spur gear with each spline defining an axis that is generally perpendicular to a longitudinal axis of the teeth of the spur gear, and
a hydraulically powered actuator acting on the first side to move the first side between a first position in which the first and second engagement surfaces are disengaged such that rotation between the first and second sides is independent, and a second position in which the first and second engagement surfaces are engaged such that rotation is transferred from the first side to the second side.

2. The transmission of claim 1, wherein the actuator is selectively actuable between a de-energized state and an energized state and wherein the channel defines a taper angle that engages the spline such that during rotation of the first and second sides an axial force is induced between the spline and the channel of sufficient magnitude to cause the first side to disengage from the second side if the actuator is de-energized.

3. The transmission of claim 1, wherein a radially extending channel defines an axis that extends along the length of the channel, and wherein a cross-section of the channel defines a v-shaped profile, and wherein a radially extending spline defines an axis that extends along the length of the spline and wherein a cross-section of the spline defines a v-shaped profile.

4. The transmission of claim 3, wherein a channel defines a taper angle that engages the spline such that during rotation of the first and second sides an axial force is induced between the spline and the channel of sufficient magnitude to cause the first side to disengage from the second side if the actuator is in the first position.

5. The transmission of claim 4, wherein the second side is positioned on the input shaft such that the second side and the input shaft have a common axis of rotation.

6. The transmission of claim 5, wherein the first side moves in a direction parallel to the axis of rotation of the input shaft.

7. A mode shift assembly for a transmission, the mode shift assembly comprising
a first side coupled to a rotational input, the first side including a first engagement surface having an imaginary center corresponding generally to the axis of rotation of the input, the first engagement surface formed to include a radially extending channel,
a second side coupled to a rotational output, the second side including a second engagement surface having an imaginary center corresponding generally to the axis of rotation of the rotational input, the second engagement surface formed to include a radially extending spline sized to engage the channel of the first engagement surface, and an actuator acting on the first side to move the first side between a first position in which the first and second engagement surfaces are disengaged such that rotation between the first and second sides is independent and a second position in which the first and second engagement surfaces are engaged such that rotation is transferred from the first side to the second side.

8. The mode shift assembly of claim 7, wherein the first engagement surface comprises a plurality of channels that vary in size as they extend radially.

9. The mode shift assembly of claim 8, wherein the second engagement surface comprises a plurality of splines that vary in size as they extend radially.

10. The mode shift assembly of claim 7, wherein the first engagement surface comprises a plurality of channels that increase in size as they extend radially.

11. The mode shift assembly of claim 10, wherein the second engagement surface comprises a plurality of splines that increase in size as they extend radially.

12. The mode shift assembly of claim 11, wherein the radially extending channels each define an axis that extends along the length of the channel, and wherein a cross-section of each channel defines a v-shaped profile, and wherein each radially extending spline defines an axis that extends along the length of the spline, and wherein a cross-section of each of the splines defines a v-shaped profile.

13. The mode shift assembly of claim 12, wherein each channel defines a taper angle that engages a respective spline such that during rotation of the first and second sides an axial force is induced between the splines and the channels of sufficient magnitude to cause the first side to disengage from the second side if the actuator is in the first position.

14. The mode shift assembly of claim 13, wherein the actuator is selectively actuable between a de-energized state and an energized state.

15. The mode shift assembly of claim 7, wherein the actuator is selectively actuable between a de-energized state and an energized state, and wherein the channel defines a taper angle that engages the spline such that during rotation of the first side and the second side, an axial force is induced between the spline and the channel of sufficient magnitude to cause the first side to disengage from the second side if the actuator is de-energized.

16. The mode shift assembly of claim 7, wherein the second side is positioned on the input shaft such that the second side and the input shaft have a common axis of rotation.

17. The mode shift assembly of claim 7, wherein the first side moves in a direction parallel to the axis of rotation of the input shaft.

18. The mode shift assembly of claim 7, wherein the second side comprises a spur gear including a number of teeth positioned about the periphery of the gear and the spline is positioned on a face of the spur gear with the spline defining an axis that is generally perpendicular to a longitudinal axis of the teeth of the spur gear.

19. The mode shift apparatus of claim 18, wherein when the first side is in the second position, the mode shift apparatus transfers rotation to the output shaft having an axis of rotation that is parallel to the axis of rotation of the input shaft.

20. The mode shift apparatus of claim 19, wherein the rotational direction of the output shaft is opposite of the rotational direction of the input shaft.

21. The mode shift apparatus of claim 20, wherein the mode shift apparatus is part of a continuously variable transmission.

22. The mode shift apparatus of claim 20, wherein the mode shift apparatus is part of an infinitely variable transmission.

23. The mode shift assembly of claim 7, wherein the actuator is hydraulically powered.

24. A transmission comprising
a rotational input,
a rotational output,
a mode shift apparatus including
a first side including a first engagement surface formed to include a number of radially extending channels,
a second side including a second engagement surface formed to include a number of radially extending splines sized to engage the channels of the first engagement surface, and
an actuator selectively actuable to move the second side in and out of engagement with the first side to thereby transfer rotational motion between the rotation input and the rotational output.

25. The transmission of claim 24, wherein the radially extending channels and radially extending splines vary in size as they extend radially.

26. The transmission of claim 25, wherein the radially extending channels and the radially extending splines increase in size as they extend radially.

27. The transmission of claim 26, wherein each of the channels define a taper angle that engages a respective spline such that an axial force is induced between the spline and the channel of sufficient magnitude to cause the second side to disengage from the first side during rotation if no force is applied to the second side to maintain engagement.

28. The transmission of claim 27, wherein a radially extending channel defines an axis that extends along the length of the channel and wherein a cross-section of the channel defines a v-shaped profile, and wherein a radially extending spline defines an axis that extends along the length of the spline and wherein a cross-section of the spline defines a v-shaped profile.

29. The transmission of claim 28, wherein one of the first or second sides is coupled to a carrier of a planetary gear set.

30. The transmission of claim 28, wherein one of the first or second sides is coupled to a sun gear of a planetary gear set.

31. The transmission of claim 28, wherein one of the first and second sides forms a spur gear including a number of teeth positioned about a periphery of the side, the and the spline is positioned on a face of the spur gear with the spline defining an axis that is generally perpendicular to a longitudinal axis of the teeth of the spur gear.

* * * * *